United States Patent
Patil

(10) Patent No.: US 10,095,794 B2
(45) Date of Patent: Oct. 9, 2018

(54) AUGMENTING SEARCH RESULTS WITH DEVICE AND APPLICATION HISTORY

(71) Applicant: Samsung Electronics Co., Ltd., Suwon-si, Gyeonggi-do (KR)

(72) Inventor: Sameer Patil, Santa Ana, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 662 days.

(21) Appl. No.: 14/478,411

(22) Filed: Sep. 5, 2014

(65) Prior Publication Data

US 2016/0070801 A1 Mar. 10, 2016

(51) Int. Cl.
*G06F 17/30* (2006.01)

(52) U.S. Cl.
CPC .............. *G06F 17/30867* (2013.01)

(58) Field of Classification Search
CPC ................................ G06F 17/30867
USPC ......................................... 707/727
See application file for complete search history.

(56) References Cited

U.S. PATENT DOCUMENTS

| | | | | |
|---|---|---|---|---|
| 9,002,821 B2* | 4/2015 | Chang | ............... | G06F 17/30864 707/711 |
| 2012/0284247 A1* | 11/2012 | Jiang | ................. | G06F 17/30867 707/706 |
| 2012/0290583 A1* | 11/2012 | Mahaniok | ................. | G06F 8/60 707/741 |
| 2012/0316955 A1* | 12/2012 | Panguluri | .............. | G06Q 30/02 705/14.41 |
| 2013/0173637 A1* | 7/2013 | Kim | ....................... | G06Q 30/02 707/748 |
| 2013/0290321 A1* | 10/2013 | Shapira | ............... | G06F 17/3053 707/723 |
| 2014/0074601 A1* | 3/2014 | Delug | .................... | G06Q 30/02 705/14.53 |
| 2014/0250147 A1* | 9/2014 | Shapira | ............. | G06F 17/30864 707/770 |
| 2015/0066886 A1* | 3/2015 | Wu | ................... | G06F 17/30864 707/706 |
| 2015/0370812 A1* | 12/2015 | Lee | ..................... | G06F 17/3087 707/711 |

OTHER PUBLICATIONS

NPL1: Title: Google App Indexing: Google Can Index & Link to Content in Your Android App. Barry Schwartz on Oct. 31, 2013 at 2:31 pm. p. 1-5. http://searchengineland.com/google-app-indexing-google-can-index-link-to-content-in-your-android-app-175692.*

* cited by examiner

*Primary Examiner* — Rehana Perveen
*Assistant Examiner* — Hicham Skhoun
(74) *Attorney, Agent, or Firm* — Jefferson IP Law, LLP

(57) ABSTRACT

Disclosed are techniques for a method for generating search results that indicate to a user whether the applications listed in the search results have been installed on one or more of their user devices. A search engine obtains one or more user device profiles and combines them to generate a master device profile. The search engine is further configured to provide search results that indicate the installation history of the applications appearing in the search results based on the master device profile. The master device profile contains the installation history of applications across the user devices associated to a particular user. A user device can be configured to generate and maintain a master device profile and can tag search results received from the search engine accordingly.

30 Claims, 11 Drawing Sheets

AUGMENTING SEARCH RESULTS WITH DEVICE AND APPLICATION HISTORY

TECHNICAL FIELD

This disclosure relates to augmenting search results with user device and application history.

BACKGROUND

Mobile devices have gained vast popularity in the United States and across the world. As a result, a user may own multiple devices, such as mobile and non-mobile devices. Users tend to search for applications that fit criteria for a desired functionality. Several applications may provide the functionality sought by the user.

SUMMARY

One aspect of the disclosure provides a method that includes obtaining, by a processing device, a first user device profile indicating a first set of applications installed on a first user device associated with a user, obtaining, by the processing device, a second user device profile indicating a second set of applications installed on a second user device associated with the user, and generating, by the processing device, a master device profile based on the first and second user device profiles. The master device profile includes a master application installation history indicative of applications installed on the first user device and/or second user device. The method also includes receiving, by the processing device, a search query from a requesting user device. The requesting user device is one of the first user device or the second user device. The method includes identifying, by the processing device, a set of search results having result objects based on the search query. Each result object in the search results is indicative of an application relevant to the search query. The method includes determining, by the processing device, whether any of the applications indicated by the result objects of the search results appear in the master application installation history. For each application indicated by the result objects and indicated in the master application installation history, the method includes tagging the result object of the application to indicate that the application is installed on at least one of the first user device and second user device. The method further includes generating, by the processing device, tagged search results based on the search results and any tags applied to any of the result objects of the search results and providing, by the processing device, the tagged search results to the requesting user device.

Implementations of the disclosure may include one or more of the following optional features. In some implementations, the tagged search results are configured to, when rendered by the requesting user device into displayed result objects, visually indicate which applications indicated by the result objects of the search results have been installed on at least one of the first user device and the second user device. The first user device profile may include a first list of application identifiers. Each application identifier in the first list indicates one of the applications installed on the first user device. The second user device profile may include a second list of application identifiers. Each application identifier in the second list indicates one of the applications installed on the second user device. The master device profile may include a master list of application identifiers. Each application identifier in the master list indicates one of the applications installed on at least one of the first user device and the second user device.

In some implementations, generating the master device profile includes adding the first list of application identifiers to the master list of application identifiers and adding the second list of application identifiers to the master list of application identifiers. The application identifiers in the first, second, and master lists of application identifiers are optionally canonical application identifiers.

The first user device profile may be further indicative of a first set of deleted applications that have been uninstalled from the first user device. The second user device profile may be further indicative of a second set of deleted applications that have been uninstalled from the second user device. The master device profile may be further indicative of a master set of deleted applications that have been uninstalled from at least one of the first user device and the second user device.

In some implementations, the method includes determining, by the processing device, whether any of the applications indicated by the result objects of the search results appear in the master set of deleted applications and, for each application indicated by the result objects and indicated in the master set of deleted applications, tagging the result object of the application to indicate that the application has been uninstalled from at least one of the first user device and the second user device. The tagged search results may further indicate on which user device each respective application is installed and/or from which user device each respective application has been uninstalled.

Another aspect of the disclosure provides a search engine including a non-transitory storage device that stores an application data store storing a plurality of application records and a master device profile data store that stores a plurality of master device profiles. Each application record includes an application record identifier, and each master device profile corresponds to a different user and indicates a master application installation history of one or more user devices of the different user. The search engine includes a processing device that executes computer readable instructions. The computer readable instructions, when executed by the processing device, cause the processing device to perform operations including obtaining a first device profile indicating a first set of applications installed on a first user device associated with a user, obtaining a second device profile indicating a second set of applications installed on a second user device associated with the user, and generating a new master device profile based on the first and second device profiles. The new master device profile includes a master application installation history indicative of applications installed on the first user device and/or the second user device. The operations further include receiving a search query from a requesting user device, which is one of the first user device or the second user device, and identifying a consideration set of application records from the application data store based on the search query. Each application record of the consideration set is indicative of an application relevant to the search query. The operations may include determining whether any of the applications indicated by the application records of the consideration set appear in the new master set of applications and, for each application indicated by the application records and indicated in the new master set of applications, tagging the application record of the application to indicate that the application is installed on at least one of the first user device and second user device. The operations include generating tagged search results based on the consideration set and any tags applied to any of the application records of the consideration set and providing the tagged search results to the requesting user device. This aspect may include any of the following optional features.

In some implementations, the tagged search results are configured to, when rendered by the requesting user device into displayable search results, visually indicate which applications indicated by the application records of the consideration set have been installed on at least one of the first user device and second user device.

The first device profile may include a first list of application identifiers. Each application identifier in the first list indicates one of the applications installed on the first user device. The second device profile may include a second list of application identifiers. Each application identifier in the second list indicates one of the applications installed on the second user device. The new master device profile may include a master list of application identifiers. Each application identifier in the master list indicates one of the applications installed on at least one of the first user device and the second user device.

The operations for generating the master device profile may include adding the first list of application identifiers to the master list of application identifiers and adding the second list of application identifiers to the master list of application identifiers. The application identifiers in the first, second, and master lists of application identifiers may be canonical application identifiers.

The first user device profile may be further indicative of a first set of deleted applications that have been uninstalled from the first user device. The second user device profile may be further indicative of a second set of deleted applications that have been uninstalled from the second user device. The master device profile may be further indicative of a master set of deleted applications that have been uninstalled from at least one of the first user device and the second user device.

In some implementations, the operations includes determining whether any of the applications indicated by the result objects of the search results appear in the master set of deleted applications and, for each application indicated by the result objects and indicated in the master set of deleted applications, tagging the result object of the application to indicate that the application has been uninstalled from at least one of the first user device and the second user device. The tagged search results may further indicate on which user device each respective application is installed and/or from which user device each respective application has been uninstalled.

In yet another aspect, a method includes generating, by a processing device of a local user device associated with a user, a local user device profile based on the applications that have been installed on the local user device, obtaining, by the processing device, a remote user device profile based on the applications that have been installed on a remote user device associated with the user, and generating, by the processing device, a master device profile based on the local user device profile and the remote user device profile. The master device profile includes a master application installation history indicative of applications installed on the local user device and/or remote user device. The method includes transmitting, by the processing device, a search query to a server, and receiving, by the processing device, a set of search results based on the search query. Each result object in the search results is indicative of an application relevant to the search query. The method includes determining, by the processing device, whether any of the applications indicated by the result objects of the search results appear in the master application installation history and, for each application indicated in the master application installation history, tagging the result object corresponding to the application to indicate that the application is installed on at least one of the local user device and remote user device. The method optionally includes generating, by the processing device, tagged search results based on the search results and any tags applied to any of the result objects of the search results and rendering, by the processing device, tagged search results into displayed result objects based on the tags. This aspect may include any of the following optional features.

In some implementations, generating the local user device profile includes identifying a list of applications installed on the local user device and associating applications in the list with corresponding application identifiers. Displayed result objects may visually indicate which applications indicated by the result objects of the search results have been installed on at least one of the local user device and the remote user device.

The local user device profile may include a first list of application identifiers. Each application identifier in the first list indicates one of the applications installed on the local user device. The remote user device profile may include a second list of application identifiers. Each application identifier in the second list indicates one of the applications installed on the remote user device. The master device profile may include a master list of application identifiers. Each application identifier in the master list indicates one of the applications installed on at least one of the local user device and the remote user device.

The generating of the master device profile may include adding the first list of application identifiers to the master list of application identifiers and adding the second list of application identifiers to the master list of application identifiers. The application identifiers in the first, second, and master lists of application identifiers may be canonical application identifiers.

The local user device profile may be further indicative of a first set of deleted applications that have been uninstalled from the user device. The remote user device profile may be further indicative of a second set of deleted applications that have been uninstalled from the remote user device. The master device profile may be further indicative of a master set of deleted applications that have been uninstalled from at least one of the local user device and the remote user device.

In some implementations, the method includes determining whether any of the applications indicated by the result objects of the search results appear in the master set of deleted applications and, for each application indicated by the result objects and indicated in the master set of deleted applications, tagging the result object of the application to indicate that the application has been uninstalled from at least one of the local user device and the remote user device. The tagged search results may further indicate on which user device each respective application is installed and/or from which user device each respective application has been uninstalled. The local user device may receive the remote user device profile directly from the remote user device via a personal area network. The local user device may receive the remote user device profile from the remote user device via a third party computing device.

DESCRIPTION OF DRAWINGS

Like reference symbols in the various drawings indicate like elements.

DETAILED DESCRIPTION

Figure 1A:
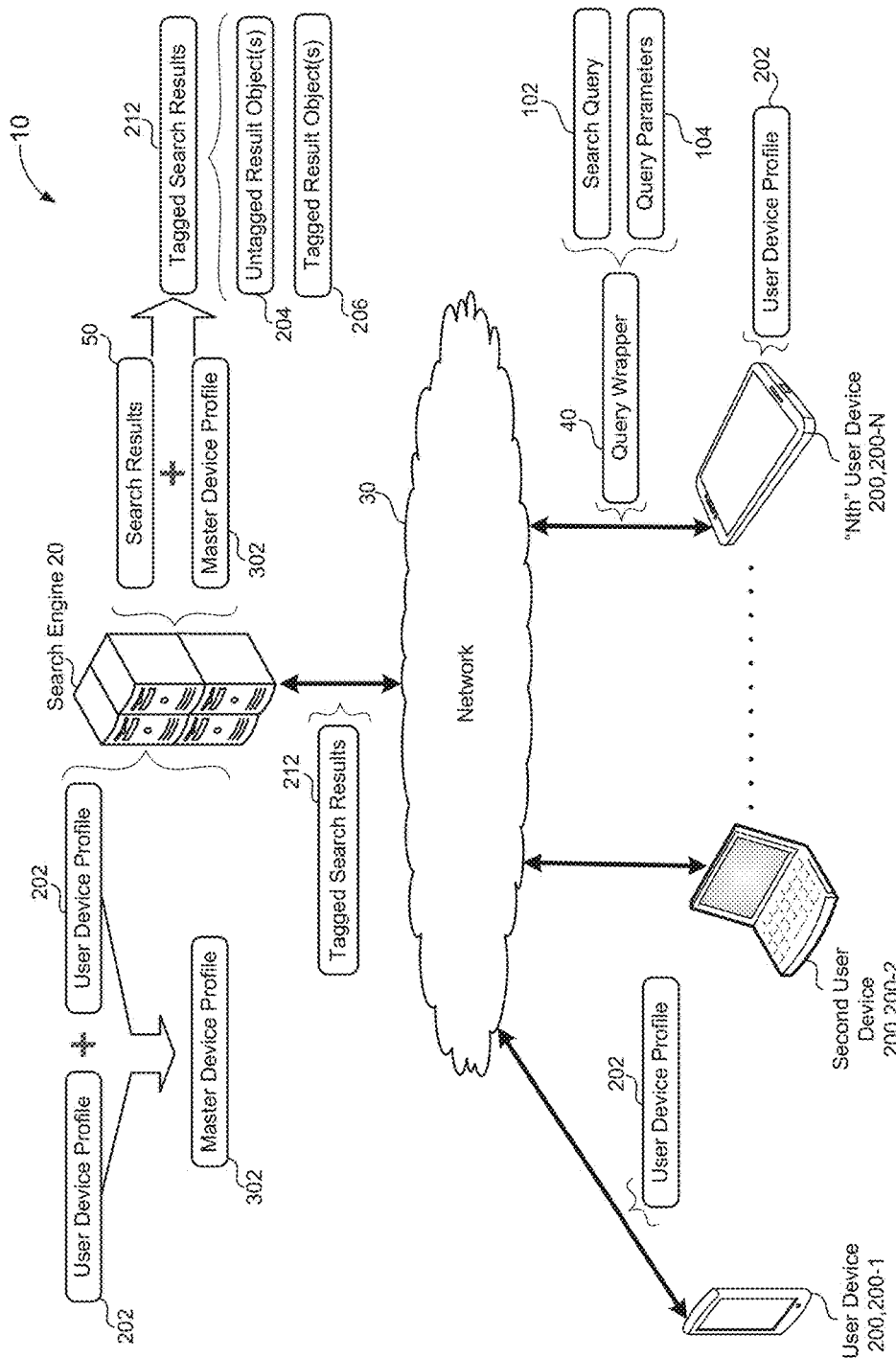
FIG. 1A is a schematic illustrating an example environment of a search engine and user devices that access the search engine via a network.

FIG. 1A illustrates an example environment 10 for processing search queries 102. The example environment 10 includes a search engine 20 in communication with one or more user devices 200-1, 200-2 . . . 200-N (referred to collectively as "user devices 200"). The search engine 20 is a system of one or more computing devices (e.g., server devices) that receives a search query 102 from a user device 200 and returns search results 50. In some implementations, the search results 50 are tagged search results 212. According to some implementations of the present disclosure, the search engine 20 executes an application search, whereby the search results 50 indicate applications (e.g. native applications 220 (FIG. 2B)) that are relevant to the search query 102. Further, the search engine 20 can tag the search results 50 in accordance with a master application installation history 310 (see FIG. 3B; hereafter "master application history 310") of a user, thereby transforming the search results 50 into to tagged search results 212. A master application history 310 can indicate whether an application is installed on one or more of the user devices 200 associated with a user of the user device 200 that transmitted the search query 102. A master application history 310 can additionally or alternatively indicate whether an application has been uninstalled from one or more of the user devices 200 associated with the user. For example, if a first application corresponding to a displayed result object 210 (see FIG. 1B) rendered by the user device 200 is currently installed on another user device 200-2 (as indicated by the master application history 310) belonging to the user, the displayed result objects 210 can indicate that the application is installed on the other user device 200-2 also associated with the user. In another example, if a second application appearing in the tagged search results 212 was previously uninstalled from the other user device 200-2, the displayed result objects 210 can indicate that the application was uninstalled from the user device 200-2.

In some implementations, the search engine 20 maintains a master device profile 302 that indicates the application status of applications that the user has previously installed on any user device 200 that is associated with the user (e.g. applications that are currently installed and/or applications that were previously installed and subsequently uninstalled from user devices 200). In this way, the search engine 20 can convey this information to the user in the tagged search results 212 even if the user's devices 200 do not share a common platform. For example, if one user device 200 runs the ANDROID® operating system by Google, Inc. and a second user device 200-2 runs the IOS® operating system by Apple, Inc., the search engine 20 can maintain a master device profile 302 that indicates the application installation history spanning both user devices 200 and 200-2. In operation, the search engine 20 can receive user device profiles 202 from each user device 200 associated with a user to generate a master device profile 302 corresponding to the user. Each user device profile 202 is a data structure that indicates the device application installation history 230 (hereinafter "device history 230") of a corresponding user device 200. The search engine 20 can merge the device history 230 from each user device profile 202 to obtain a master application history 310.

Referring back to FIG. 1A, the search engine 20 receives a query wrapper 40 from a user device 200 via a network 30. The query wrapper 40 includes a search query 102 and may contain one or more query parameters (e.g. a username, geolocation, a location of the user device 200, an operating system of the user device 200, a user account of the user, etc.). In some implementations, the query wrapper 40 may also contain the user device profile 202 of the user device 200. In other implementations, the user device 200 transmits the user device profile 202 separately from a query wrapper 40. For example, the user device 200 may transmit the user device profile 202 at the beginning of a search session or at predetermined intervals (e.g., every Monday at 4:00 AM).

The search engine 20 identifies search results 50 based on the search query 102. The search results 50 may contain one or more untagged result objects 204. An untagged result object 204 is a unit of the search results 50 that contains data that the user device 200 utilizes to render displayed result objects 210 (see e.g., FIG. 1B). For example, an untagged result object 204 can include an application identifier, a canonical application identifier, an application name, a description of the application, an icon of the application, one or more access mechanisms that can be used to launch the application if installed on the user device, and/or an access mechanism to download the application from a digital distribution platform (e.g., the GOOGLE PLAY® digital distribution platform by Google, Inc., the APP STORE® digital distribution platform by Apple, Inc., or the AMAZON® APPSTORE digital distribution platform by Amazon, Inc.). The search engine 20 may tag an untagged result object 204 based on the master device profile 302. For example, the search engine 20 may tag the untagged result object 204 to indicate that its corresponding application is installed on the user device 200, was uninstalled from the user device 200-2, installed on another user device 200-3, and/or uninstalled from yet another user device 200-4. The user device 200 renders each tagged result object 206 and/or untagged result object 204 to obtain a displayed result object 210. A displayed result object 210 can include a link to launch the application if the application is installed on the user device 200 and/or a link to launch a digital distribution platform and download the application to the user device 200 if the application is not currently installed on the user device 200.

Figure 1B:
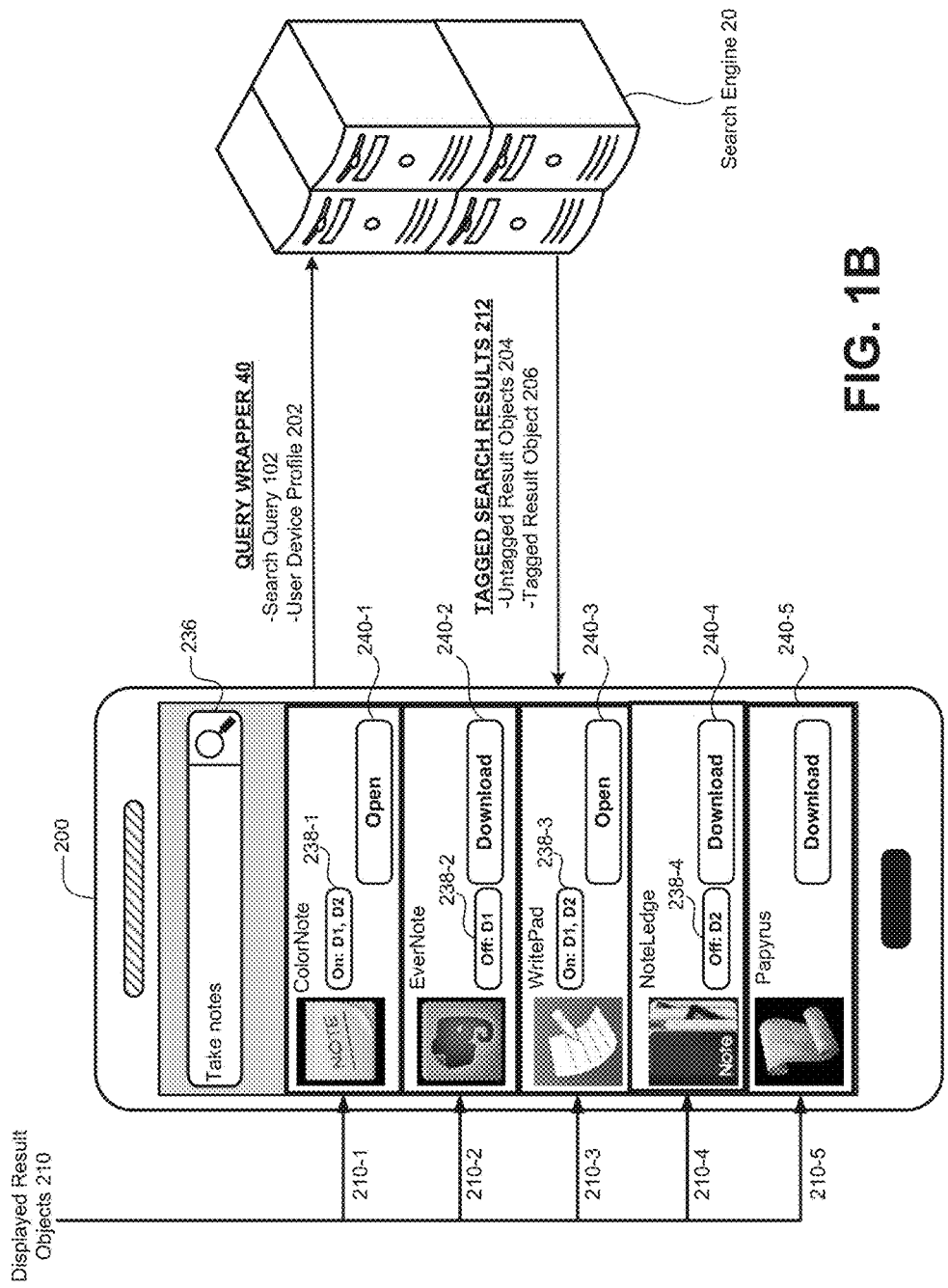
FIG. 1B is a schematic illustrating an example of search results being displayed by a user device.

FIG. 1B illustrates an example user device 200 displaying displayed result objects 210 via a graphical user interface. The example graphical user interface displays a search bar 236 and displayed result objects 210. In the illustrated example, the user has entered the search query 102 "Take notes" into the search bar 236. It is noted that while the search bar 236 is shown in relation to the graphical user interface of a native application, a search application 216 (FIG. 2A) may display the search bar 236 on a home screen of the user device 200. The tagged search results 212 include a plurality of displayed result objects 210. In the illustrated example, the user device 200 includes device indicators 238-1, 238-2, 238-3, 238-4 (hereinafter described collectively as device indicators 238) on a subset of the displayed result objects 210. A device indicator 238 can indicate the application installation history of a particular application across the user's user devices 200. In the illustrated example, a displayed result object 210-1 includes a device indicator 238-1 that indicates that the COLORNOTE® application by Social & Mobile, Inc. is installed on a first user device 200-1 and a second user device 200-2 (illustrated by the text "On: D1, D2" in FIG. 1B). The displayed result object 210-1 can also provide a user selectable link 240-1 that allows a user to open the COLORNOTE® application on the user device 200. A second displayed result object 210-2 includes a device indicator 238-2 that indicates that the EVERNOTE® application by Evernote Corp. has been uninstalled from the first user device 200-1. As can be seen, the second displayed result object 210-2 includes a user selectable link 240-2 to download the EVERNOTE application to the first user device 200-1. A third displayed result object 210-3 includes a device indicator 238-3 that indicates that the WRITEPAD® application by PhatWare Corp. is installed on a first user device 200-1 and on a second user device 200-2. The third displayed result object 210-3 additionally provides a user selectable link 240-3 that allows a user to open the WRITEPAD® application on the user device 200. A fourth displayed result object 210-4 includes a device indicator 238-4 that indicates that the NOTELEDGE application by Kdan Mobile Software Ltd. has been previously uninstalled from a second user device 200-2. The fourth displayed result object 210-4 additionally provides a user selectable link 240-4 that allows a user to download the NOTELEDGE application to the first user device 200. A fifth displayed result object 210-5 is an example of a displayed result object 210-5 that the user device 200-1 generated from an untagged result object 204. Since the displayed result object 210-5 was generated from an untagged result object 204, the user never installed or uninstalled the application PAYPRUS by Steadfast Innovation, LLC on or from any of the user devices 200 associated with the user. In this scenario, the user device 200 does not display any device indicators 238; instead, the user device 200 provides a user selectable link 240-5 to download the PAPYRUS application, thereby implicitly indicating to the user that they have not installed the application on any of their devices 200. The user selectable links 240-1 . . . 240-5 are hereinafter described collectively as user selectable links 240. Though not explicitly shown, a displayed result object 210 can display any combination of device indicators 238. These combinations can include, but are not limited to, situations where a requesting user device 200 has installed a particular application that no other user devices 200 have installed, and/or where the requesting user device 200 is the only user device 200 that has not uninstalled a particular application, and/or when a particular application has been uninstalled from all of user's devices 200. While FIG. 1B depicts device indicators 238 displaying the application installation history across two user devices 200-1, 200-2, a device indicator 238 can indicate the application installation history across any number of user devices 200. Furthermore, though FIG. 1B depicts device indicators 238 as text, device indicators 238 can be represented by symbols, images, or any other suitable medium.

Figure 2A:
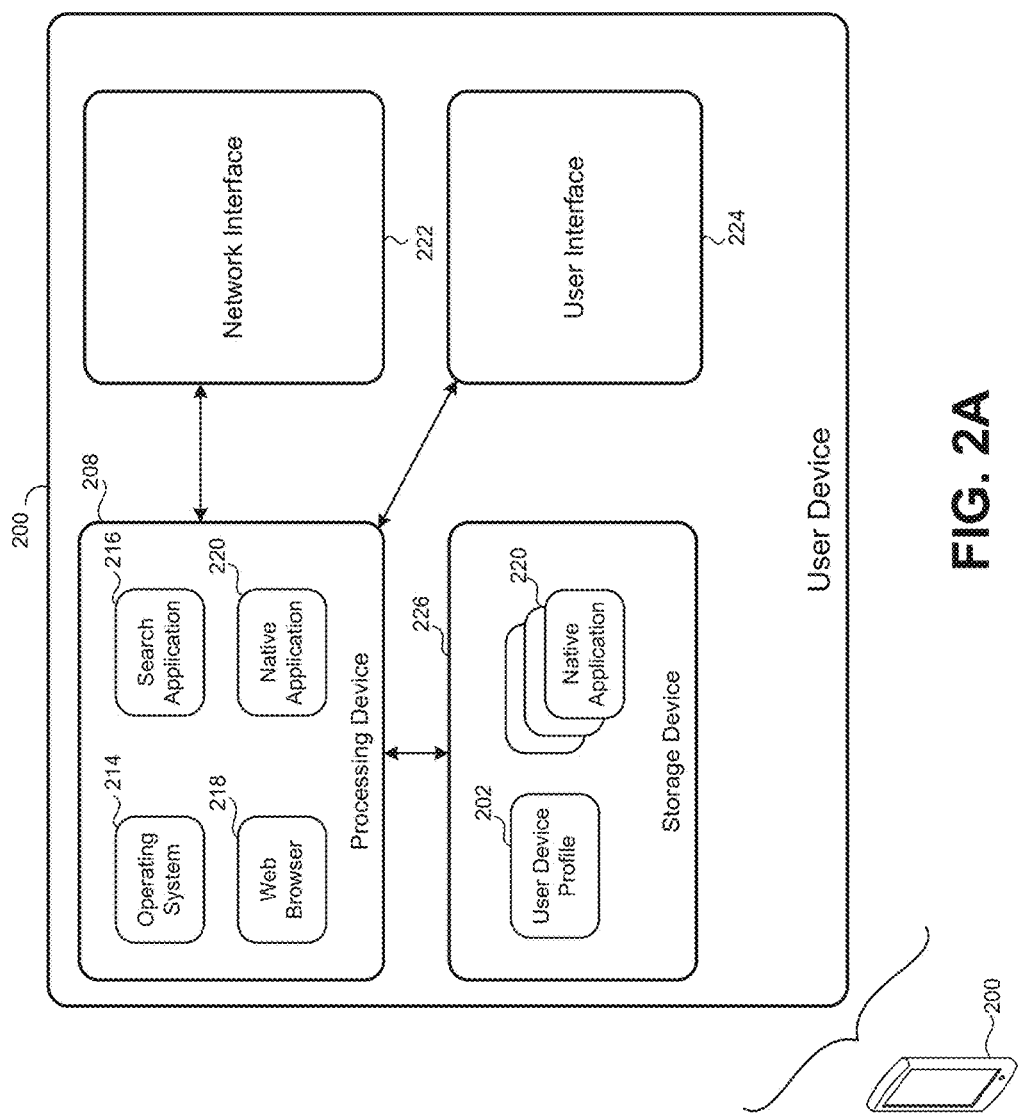
FIG. 2A is a schematic illustrating example components of a user device.

FIG. 2A illustrates an example of a user device 200 according to some implementations of the present disclosure. The example user device 200 can include a processing device 208, a storage device 226, a network interface device 222, and a user interface 224. The user device 200 can include additional components not depicted in FIG. 2A (e.g., accelerometer, sensors, GPS module).

The processing device 208 includes memory (e.g., RAM and/or ROM) that stores computer readable instructions and one or more processors that execute the computer readable instructions. In implementations where the processing device 208 includes more than one processor, the processors can execute in a distributed or individual manner. The processing device 208 can execute an operating system 214, a search application 216, a Web browser application 218, and a plurality of native applications 220, all of which may be embodied as computer readable instructions that are executed by the processing device 208. The operating system 214 acts as an interface between higher level applications and the processing device 208.

The network interface device 222 includes one or more devices that are configured to communicate with the network 30. The network interface 222 can include one or more transceivers for performing wired or wireless communication. Examples of the network interface 222 can include, but are not limited to, a transceiver configured to perform cellular communications (e.g., transmission using the third generation (3G) or fourth generation (4G) telecommunications standards), a transceiver configured to perform communications using the IEEE 802.11 wireless standard, an Ethernet port, a wireless transmitter, and a universal serial bus (USB) port.

The storage device 226 can include one or more computer readable media that store data. The storage device 226 can store some or all of the computer readable instructions that define the search application 216, the Web browser application 218, and the one or more other native applications 220. The storage device 226 can, additionally or alternatively, store some or all of the user device profile 202 of the user device 200. The storage device 226 can store other data as well (e.g., media contents, application data, contacts, documents).

The user interface 224 can include one or more devices that allow a user to interact with the user device 200. The user interface 224 can include one or more of, for example, a touchscreen, a QWERTY keyboard, a display device, speakers, a touchpad, and a microphone. The user interface 224 receives input from the user and provides the input to the processing device 208. The user interface 224 receives output from the processing device 208 and presents (e.g., displays) the output to the user.

The Web browser application 218 is an application that requests Web data from a Web server and displays the data on the user interface device 224. A Web application may be identified by a Web resource identifier (e.g., a URL). In some implementations, the Web browser application 218 can access a specific state of a Web application by accessing a Web server located in the domain portion of a Web resource identifier and providing a request to the Web server using the state parameters indicated in the path portion of the Web resource identifier.

The native applications 220 are applications that are executed, in part, by the processing device 208. Native applications 220 can be developed by third parties and made available to consumers in a variety of manners. For instance, a user can download a native application to the user device 200 from a digital distribution platform or from a Web site associated with a third party. Additionally or alternatively, the user can load a native application into the storage device 226 of the user device 200 from a removable medium, such as a CD-ROM. Native applications 220 can provide any suitable functionality.

The search application 216 is configured to receive a search query 102 from a user via the user interface 224 and transmit the search query 102 along with any suitable query parameters 104 to the search engine 20. The search application 216 is also configured to determine a user device profile 202 of the user device 200, which the search application 216 transmits to the search engine 20. The search application 216 receives search results 50 (e.g., tagged result objects 206 and untagged result objects 204) from the search engine 20. The search application 216 can render and display the tagged result objects 206 and/or untagged result objects 204 as displayed result objects 210 (e.g., as shown in FIG. 1B.). In the illustrated example, the search application 216 is shown as a native application 220. Though described herein as a native application that performs a search function, the search application 216 can be any suitable application that encapsulates a search function. Additionally or alternatively, the search application 216 can be a Web application that is accessed using the Web browser application 218.

Figure 2B:
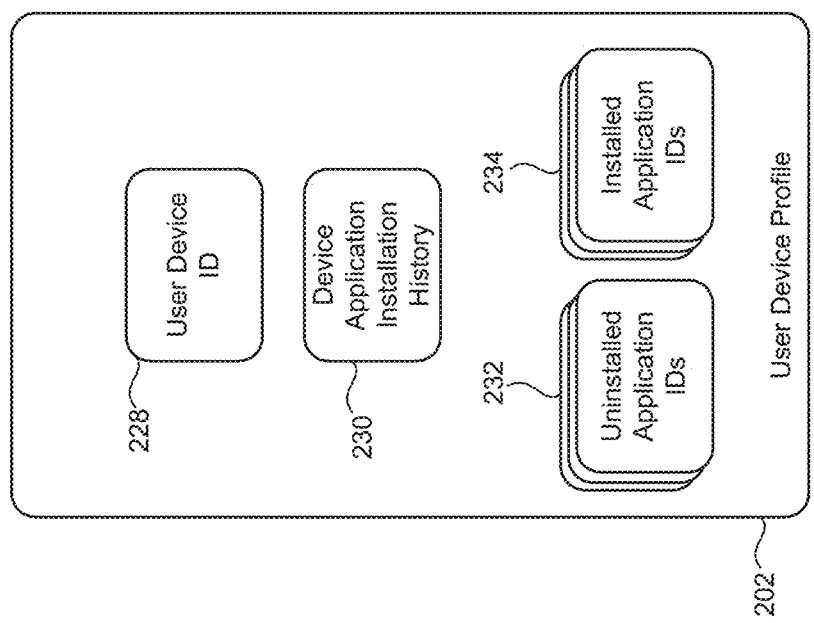
FIG. 2B is a schematic illustrating an example user device profile.

FIG. 2B illustrates an example of a user device profile 202. The search application 216 generates and maintains a user device profile 202 that corresponds to the user device 200. In some implementations, the search application 216 can generate a unique user device ID 228 that allows the search engine 20 to determine which user device profile 202 corresponds to a particular user device 200 among multiple user devices 200 associated with the user. Alternatively, the search engine 20 may assign the user device ID 228 to the user device 200 as part of a registration process performed between the user device 200 and the search engine 20. Additionally, as previously described, a user device profile 202 indicates the device history 230 of the corresponding user device 200. The search application 216 can maintain the device history 230 by storing one or more sets of application identifiers (hereinafter "application IDs") and/or canonical application identifiers (hereinafter "canonical application IDs"). For example, a first set may list installed application IDs 234. Installed application IDs indicate native applications 220 that are currently installed on the user device 200. A second set may list uninstalled application IDs 232. Uninstalled application IDs 232 indicate native applications 220 which have been installed but subsequently uninstalled from the user device 200. The search application 216 can maintain the contents of the device history 230 in any suitable manner. In one example, the search application 216 can update the set of installed application IDs 234 whenever a user downloads and installs a new application. In another example, the search application 216 can periodically scan the user device 200 to determine whether there are any applications installed on the user device 200 that do not appear in the set of installed application IDs 234. In this example, the search application 216 can append the application IDs of newly installed applications to the set of installed application IDs 234. In another example, the search application 216 can update the set of uninstalled application IDs 232 whenever a user uninstalls an application from the user device 200. In yet another example, the search application 216 can periodically scan the user device 200 for currently installed applications. In this example, the search application 216 can compare the set of installed application IDs 234 to a set of installed application IDs from the most recent scan of the user device 200 to determine any application IDs that are missing from the most recent set of installed application IDs. The search application 216 can add the missing application IDs to the set of uninstalled application IDs 232. In this scenario, the search application 216 can remove these application IDs from the set of installed application IDs 234 and append them to the set of uninstalled application IDs 232.

The search application 216 can transmit the user device profile 202 to the search engine 20 at any suitable time. In some implementations, the search application 216 can communicate the user device profile 202 at the beginning of a search session. A search session is a period during which the search application 216 sends search queries 102 to the search engine 20. Upon initiating a search session, the search engine 20 can assign a session identifier ("session ID") to the search session. The search application 216 can provide the user device profile 202 to the search engine 20 and the search engine 20 can associate the session ID with the user device profile 202. The search engine 20 may associate other information to the session ID as well. For instance, the search engine 20 can associate a master device profile 302 to the session ID. In some implementations, the search application 216 communicates the search query 102 in a query wrapper 40. In some implementations, other query parameters 104 can include the session ID. In these implementations, the privacy of the user may be protected, as information regarding a user's device is associated with a session ID rather than the user. In some implementations, the search application 216 communicates the user device profile 202 with the search query 102 in the query wrapper 40. In these implementations, the user device profile 202 does not need to be transmitted at the initiation of the search session. Additionally or alternatively, the search application 216 can communicate the user device profile 202 at predetermined intervals or times (e.g., Monday at 4:00 AM or every 48 hours).

The search application 216 can further be configured to present a graphical user interface ("GUI") that displays tagged search results 212 and allows a user to enter a search query 102. In some implementations, the GUI can display a search bar 236 (FIG. 1B) whereby the user can provide text and/or speech input into the search bar 236. Additionally or alternatively, the operating system 214 of the user device 200 can display the search bar 236 on the home screen of the user device 200, whereby a user can enter the search query 102 directly from the home screen. In these implementations, when the user enters the search query 102 into the search bar 236 displayed on the home screen and executes the search, the operating system 214 of the user device 200 can launch the search application 216, which generates a query wrapper 40 containing the search query 102 and zero or more other query parameters 104. The search application 216 can obtain the other query parameters 104 in any suitable manner. For example, the search application 216 can obtain information regarding the user device 200 (e.g., device type, operating system type, operating system version) from a file in the storage device 226 or in the memory of the processing device 208. Additionally or alternatively, the search application 216 can obtain information regarding the user device 200 from a sensor or component of the user device 200 (e.g., the geo-location can be obtained from a GPS module of the user device 200). The search application 216 can create a query wrapper 40 based on the provided search query 102 and the obtained query parameters 104.

The search application 216 transmits the query wrapper 40 to the search engine 20, which can respond with the tagged search results 212 (e.g., FIG. 1B). The tagged search results 212 can contain tagged result objects 206 or untagged result objects 204. The search application 216 checks the tagged search results 212 for tagged result objects 206. For each tagged result object 206, the search application 216 determines what type of device indicator 238 to include in the displayed result object 210 based on its corresponding tag.

The search application 216 receives tagged search results 212 and renders each result object therein into a displayed result object 210 (see FIG. 1B). As previously discussed, the search application 216 can display tagged result objects 206 or untagged result objects 204. Tagged result objects 206 can be rendered and displayed to include device indicators 238. Both tagged result objects 206 and untagged result objects 204 can be rendered and displayed to include user selectable links 240 that allow the user to open the application corresponding to the displayed result object 210 if it is installed on the user device 200. Both tagged result objects 206 and untagged result objects 204 can be rendered and displayed to include user selectable links 240 that direct the user to a digital distribution platform (e.g. the GOOGLE PLAY® digital distribution platform by Google, Inc., the APP STORE® digital distribution platform by Apple, Inc., or the AMAZON® APPSTORE digital distribution platform by Amazon, Inc.) where the user can download the application if it is not already installed on the receiving device. The search application 216 determines which result objects in the tagged search results 212 have been tagged by the search engine 20. The search application 216 then renders the tagged result objects 206 into displayed result objects 210 that contain device indicators 238 and user selectable links 240. The search application 216 also renders the untagged result objects 204 into displayed result objects 210 that contain user selectable links 240. In such scenarios, the user selectable links 240 may be devoid of device indicators 238 or may indicate that the application has never been installed on any of the user's user devices 200. The search application 216 then outputs the displayed objects 210 to the user device 200 as depicted by FIG. 1B.

Figure 3A:
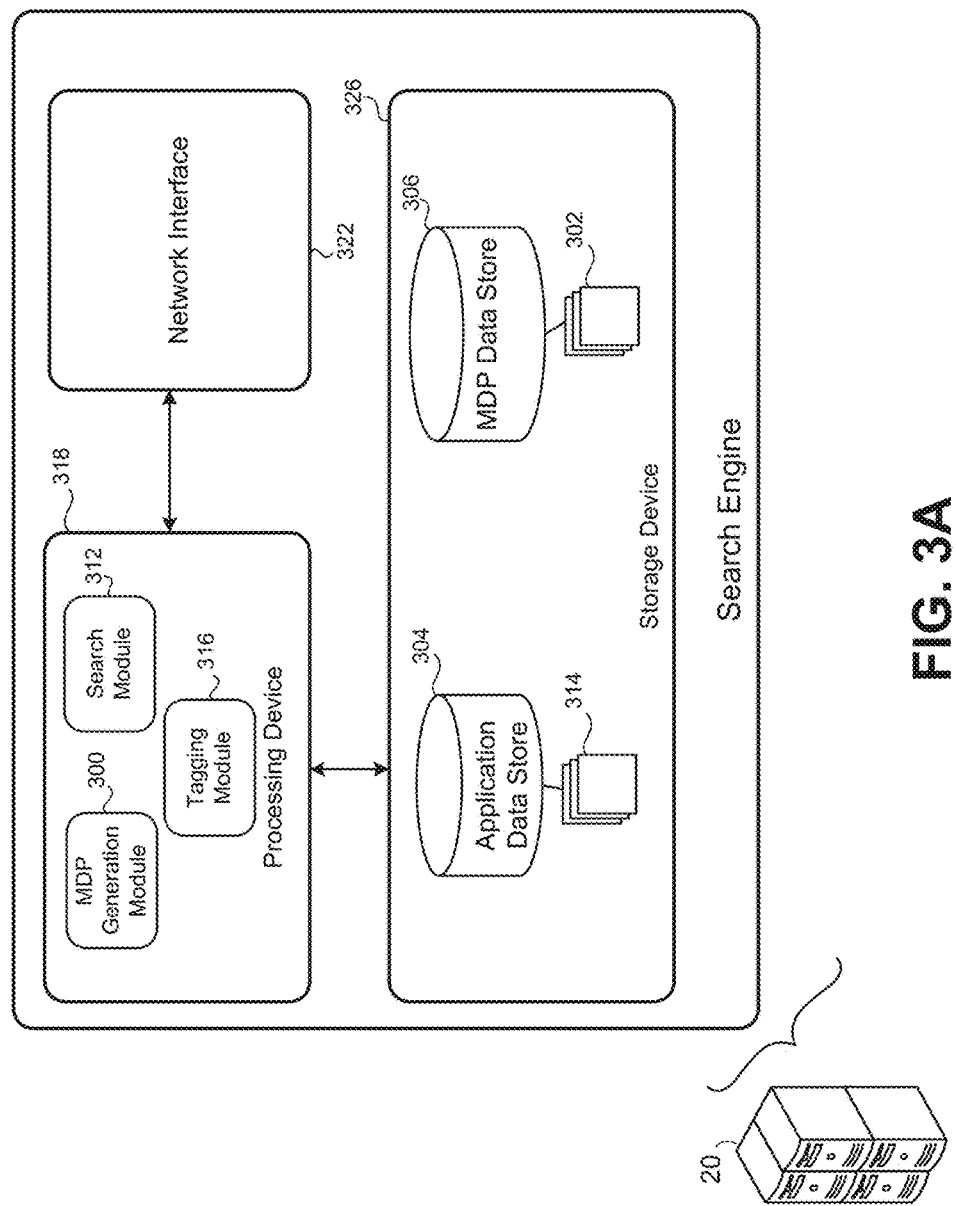
FIG. 3A is a schematic illustrating example components of a search engine.

FIG. 3A illustrates an example of the search engine 20. The search engine 20 is configured to receive search queries 102 and user device profiles 202 from user devices 200 and to perform application searches based on the search queries 102 and the user device profiles 202. The search engine 20 can include a processing device 318, a network interface 322, and a storage device 326.

The processing device 318 can include memory (e.g. RAM and/or ROM) that stores computer readable instructions and one or more physical processors that execute the computer readable instructions. In implementations where the processing device 318 includes more than one processor, the processors can operate in an individual or distributed manner. Furthermore, in these implementations the two or more processors can be in the same computing device or can be implemented in separate computing devices (e.g., rack-mounted servers). The processing device 318 can execute a search module 312, a tagging module 316, and a master device profile generation module 300 (hereafter "MDP generation module 300"). The processing device 318 can execute additional components not shown.

The network interface 322 includes one or more devices that can perform wired or wireless (e.g., WiFi or cellular) communication. Examples of the network interface device 322 include, but are not limited to, a transceiver configured to perform communications using the IEEE 802.11 wireless standard, an Ethernet port, a wireless transmitter, and a universal serial bus (USB) port.

The storage device 326 can include one or more computer readable storage media (e.g., hard disk drives and/or flash memory drives). The storage media can be located at the same physical location or at different physical locations (e.g., different servers and/or different data centers). The storage device 326 can store one or more of an application data store 304 and master device profile data store 306 (hereinafter "MDP data store 306").

In implementations where the search module 312 performs application searches, the search module 312 can utilize the application data store 304 to perform the searches. The application data store 304 may include one or more databases, indices (e.g., inverted indices), files, or other data structures storing application data. The application data store 304 includes application data of different applications. The application data of an application may include keywords associated with the application, reviews associated with the application, the name of the developer of the application, the platform of the application, the price of the application, application statistics (e.g., a number of downloads of the applications and/or a number of ratings of the application), a category of the application, and other information. The application data store 304 may include metadata for a variety of different applications available on a variety of different operating systems. The application data store 304 may further include information corresponding to the canonical application records associated with different applications.

In some implementations, the application data store 304 stores the application data in application records 314. Each application record 314 can correspond to an application and may include the application data pertaining to the application. An example application record 314 includes an application name, an application ID, a canonical application ID, and other application features. A canonical application ID allows the search engine 20 to differentiate between different editions of the same application. For example, a particular application may be configured to run on the ANDROID® operating system, on the IOS® operating system, or as a web application within a web browser. The application records 314 corresponding to those respective applications may contain different application IDs but correspond to the same canonical application ID.

The application name may be the trade name of the application represented by the data in the application record 314. The application ID identifies the application record 314 amongst the other application records 314 included in the application data store 304. In some implementations, the application ID may uniquely identify the application record 314. In some implementations, the application ID is also used by the search application 216 to populate the user device profile 202. In some implementations, the digital distribution platform that offers the applications assigns a unique application ID. In other implementations, the search engine 20 assigns application IDs to each application when creating an application record 314 for the application.

The application features may include any type of data that may be associated with the application represented by the application record 314. The application features may include a variety of different types of metadata. For example, the application features may include structured, semi-structured, and/or unstructured data. The application features may include information that is extracted or inferred from documents retrieved from other data sources (e.g., digital distribution platforms, application developers, blogs, and reviews of applications) or that is manually generated (e.g., entered by a human). The application features may include the name of the developer of the application, a category (e.g., genre) of the application, a description of the application (e.g., a description provided by the developer), a version of the application, the operating system the application is configured for, and the price of the application. The application features further include feedback units provided to the application. Feedback units can include ratings provided by reviewers of the application (e.g., four out of five stars) and/or textual reviews (e.g., "This app is great"). The application features can also include application statistics. Application statistics may refer to numerical data related to the application. For example, application statistics may include, but are not limited to, a number of downloads of the application, a download rate (e.g., downloads per month) of the application, and/or a number of feedback units (e.g., a number of ratings and/or a number of reviews) that the application has received. The application features may also include information retrieved from Web sites, such as comments associated with the application, articles associated with the application (e.g., wiki articles), or other information. The application features may also include digital media related to the application, such as images (e.g., icons associated with the application and/or screenshots of the application) or videos (e.g., a sample video of the application).

Figure 3B:
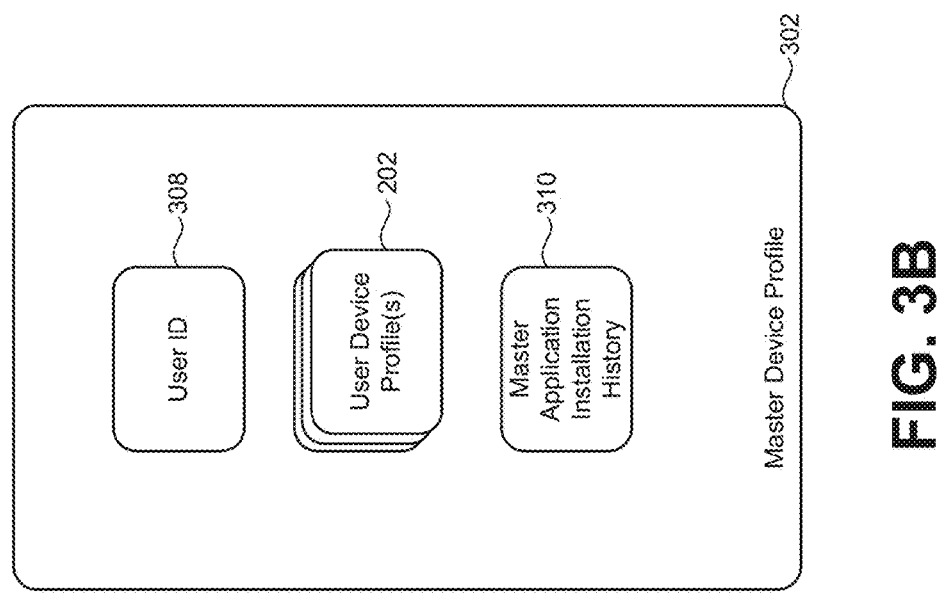
FIG. 3B is a schematic illustrating an example master device profile.

The MDP data store 306 may contain a variety of information associated with users who submit search queries 102 to the search engine 20. In some implementations, the MDP data store 306 can maintain master device profiles 302 for users that opt to provide user data to the search engine 20. FIG. 3B illustrates an example of a master device profile 302. A master device profile 302 may generally represent user data stored in the MDP data store 306 that is related to a particular user. Each master device profile 302 can correspond to a user and may include user data pertaining to the user devices 200 of the user. The user data of a user may include a unique user ID 308 for the user, a master application history 310 corresponding to the user's user devices 200, zero or more user device profiles 202 associated with the user's devices 200, and any other suitable information. The MDP data store 306 may include one or more databases, indices (e.g., inverted indices), files, or other data structures storing this data.

The user ID 308 may be a string made up of symbols, numbers, and/or letters representing the master device profile 302. The user ID 308 identifies the master device profile 302 amongst the other master device profiles 302 included in the MDP data store 306. In some implementations, the user ID 308 may uniquely identify the master device profile 302. In some implementations, the user ID 308 may be used by the search application 216 to identify user device profiles 202 associated with the master device profile 302.

In some implementations, the master device profile 302 can store a master application history 310. A master application history 310 corresponds to the aggregation of device histories 230 of the user devices 200 associated with the user. In these implementations, the master application history 310 stores the application IDs of the applications installed on or uninstalled from the user devices 200. For each application ID in the master application history 310, the master device profile 302 also maintains the associated user device IDs 228 of user devices 200 on/from which the application has either been installed/uninstalled. In these implementations, the master device profile 302 does not need to store user device profiles 202 but can instead maintain a master application history 310 that keeps track of installed application IDs 234, uninstalled application IDs 232, and any corresponding user devices 200. For example, the master application history 310 may be organized in the form of a lookup table that associates user device IDs 228 with installed application IDs 234 and uninstalled application IDs 232. In some implementations, the installed application IDs 234 and the uninstalled application IDs 232 are represented by canonical application IDs. Thus, the canonical application IDs can correspond to the installed application IDs 234 and uninstalled application IDs 232 that appear in the lookup table for a particular user device ID 228. In this way, the master device profile is representative of applications that have been installed on or uninstalled from the user devices 200 regardless of the editions of the applications. In some implementations, the master device profile 302 may also store the user device profiles 202 of each user device 200 associated with a user and thus maintain separate device histories 230. For example, in addition or alternatively to a lookup table, the master device profile 302 may store the user device profiles 202 associated with the user. In this way, the master device profile 302 can access device histories 230 and user device IDs 228 via the user device profiles 202 and/or a lookup table.

A master application history 310 can leverage canonical application records to solve the problem of keeping track of an application that can exist as multiple editions and correspond to different application IDs but nevertheless be the same application. To illustrate this problem, consider the popular ANGRY BIRDS® application by Rovio Entertainment Ltd. The ANGRY BIRDS® application may be configured to run on the ANDROID® operating system, on the IOS® operating system, and on the WINDOWS® operating system. Each edition of the ANGRY BIRDS® application may thus be configured to run on a different operating system and be associated with a different application ID, but regardless of operating system still provide the same or similar functionality, user experience, and/or information. Canonical application records allow the search engine 20 to determine when an application on a first user device 200 may be a different edition of the same application on a second user device 200-2. A master application history 310 can leverage canonical application records by storing a canonical application ID in the aforementioned lookup table.

Canonical application records are application records that can be associated with one or more application editions. Canonical application records can contain a canonical application ID and can reference one or more application editions. An application edition refers to a particular implementation or variation of an application. For example, an application edition may refer to a version of a native application, such as a version 1.0 of a native application or a version 2.0 of a native application. In another example, an application edition may refer to an implementation of a native application for a specific platform, such as a specific operating system. For example, ANGRY BIRDS® version 1.0 may be configured to run on the ANDROID® operating system or on the IOS® operating system; each version can correspond to a different application edition. Canonical application records keep track of sets of application editions that are functionally equivalent (or nearly equivalent). For example, an application edition that represents ANGRY BIRDS—STAR WARS EDITION can be associated with a different canonical application record than ANGRY BIRDS®—VERSION 1.0. However, two different editions of ANGRY BIRDS®—VERSION 1.0 may be associated with the same canonical application record.

A master device profile 302 may be generated and updated in a variety of different ways and at any suitable time. In some implementations, the MDP generation module 300 (see FIG. 3A) receives one or more user device profiles 202. The MDP generation module 300 can generate a master device profile 302 based thereon. In some implementations, the search engine 20 can generate a master device profile 302 when it receives a query wrapper 40 containing query parameters 104 and/or a search query 102 from a user device 200. In other implementations, the MDP generation module 300 can receive a user device profile 202 at any time and in any suitable manner and use it to generate or update a master device profile 302 as described herein. Upon receiving one or more user device profiles 202 associated with a particular user, the MDP generation module 300 can determine whether there already exists a master device profile 302 for the user by accessing the MDP data store 306. If a master device profile 302 for the user already exists, the MDP generation module 300 can perform the rest of its operations using that master device profile 302. If a master device profile 302 does not exist for the user, the MDP generation module 300 can create a master device profile 302 for the user based on the received user device profiles 302.

If a master device profile 302 does not exist for the user, the MDP generation module 300 can create a user ID 308 for the user associated with the received user device profiles 202. The MDP generation module 300 can then store the user ID 308 and the user device profile 202 in the master device profile 302. The MDP generation module 300 can also store any additional user device profiles 202 associated with a user in the data structure that represents the master device profile 302. Additionally or alternatively, the MDP generation module 300 can create a master application history 310 by combining the device histories 230 located in the received user device profiles 202. In some examples, there may only be a single user device profile 202 associated with a user. In this example the master application history 310 may be substantially, if not entirely, equivalent to the device history 230 of the received user device profile 202.

The MDP generation module 300 is also configured to determine whether there already exists a master device profile 302 associated with a user device profile 202. The MDP generation module 300 can access the MDP data store 306 to make this determination. If a master device profile 302 corresponding to the user device profile 202 exists in the MDP data store 306, the MDP generation module 300 is configured to append the user device profile 202 and the information provided therein in the manner previously described to the existing master device profile 302. For example, the MDP generation module 300 can forego creating a user ID 308 and instead use the user ID 308 indicated by the master device profile 302 retrieved from the MDP data store 306. The MDP generation module 300 can further store the user device profile 202 in the existing master device profile 302 and/or append the device history 230 indicated by the user device profile 202 to the master application history 310.

Figure 4:
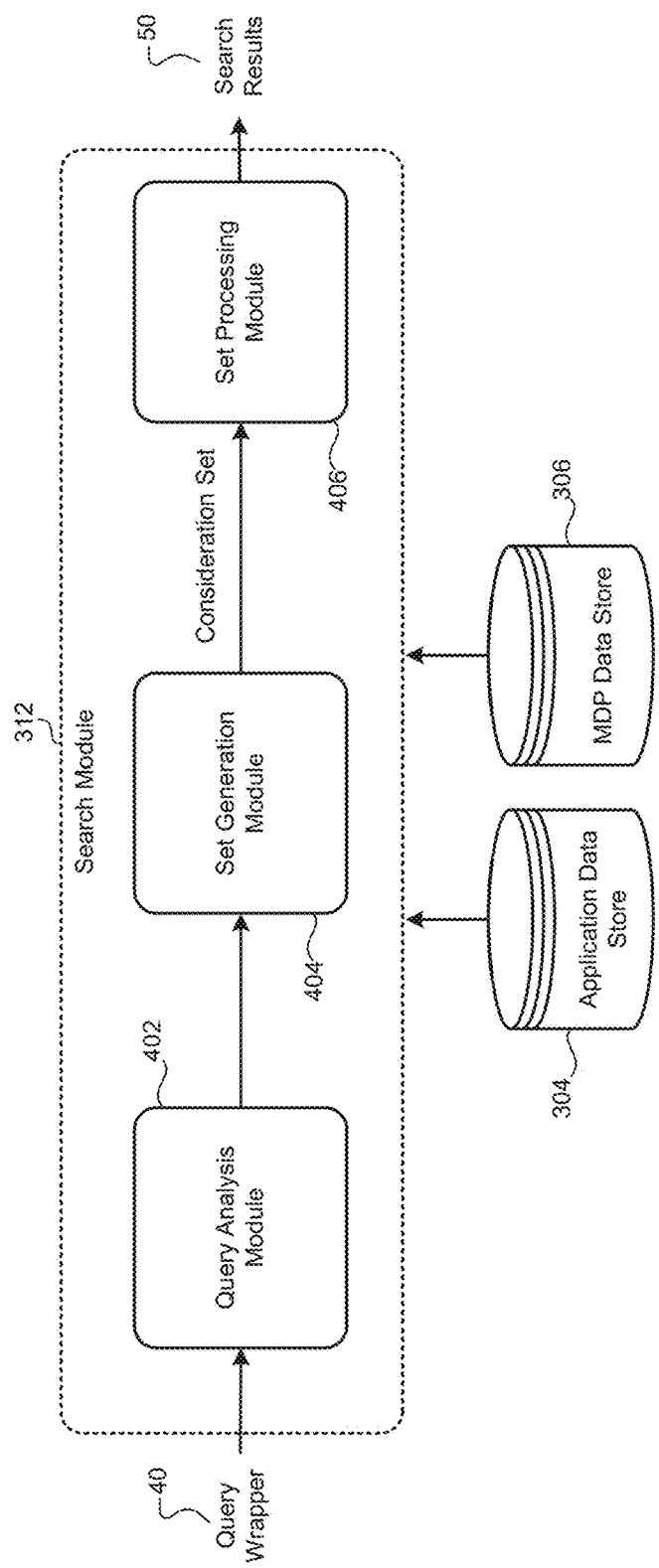
FIG. 4 is a schematic illustrating example components of a search module.

A search module 312 can be configured to access an application data store 304. Using the application data store 304, the search module 312 can determine whether any application records 314 exist that may satisfy a search query 102. FIG. 4 shows an example application search module 312 which may be included in the search engine 20. The application search module 312 includes a query analysis module 402, an application set generation module 404 (hereinafter "set generation module 404"), and an application set processing module 406 (hereinafter "set processing module 406"). The query analysis module 402 analyzes a received search query 102. The set generation module 404 identifies a set of applications (e.g., application records) based on the received search query 102. The identified set of applications may be referred to herein as a "consideration set." The set processing module 406 processes (e.g., scores) the consideration set to generate a set of search results 50 that may include a list of applications along with corresponding result scores indicating the relative rank of each application in the list.

The query analysis module 402 receives the search query 102. The query analysis module 402 may perform various analysis operations on the received search query 102. For example, analysis operations performed by the query analysis module 402 may include, but are not limited to, tokenization of the search query 102, filtering of the search query 102, stemming, synonymization, and stop word removal.

The set generation module 404 identifies a set of applications (i.e., the consideration set) based on the search query 102. In some examples, the set generation module 404 may identify the set of applications by identifying application records 314 based on matches between terms of the search query 102 and terms in the application records 314. For example, the set generation module 404 may identify a set of applications in the application data store 304 based on matches between tokens generated by the query analysis module 402 and words included in the application records 314. The consideration set of applications may be a list of application records 314 in some examples. For example, the consideration set may be a list of application IDs, canonical application IDs, and/or a list of application names.

The set processing module 406 may generate a result score for each of the applications included in the consideration set in order to generate the set of search results 50. In these implementations, the set of search results 50 may include a list of applications (e.g., result objects containing application IDs and/or application names) each of which is associated with a corresponding result score. In some examples, the search results 50 may include all of the applications from a consideration set. In other examples, the search results 50 may include a subset of the consideration set. For example, the subset may be those applications having the largest result scores.

The information conveyed by the search results 50 may depend on how the result scores are calculated by the set processing module 406. For example, the result scores may indicate the relevance of an application to the search query 102, the popularity of an application, the quality of an application, or other properties of the application depending on what parameters the set processing module 406 uses to score the applications.

The set processing module 406 may generate result scores for applications in a variety of different ways. In general, the set processing module 406 may generate a result score for an application based on one or more scoring features. The scoring features may be associated with the application and/or the search query 102. An application scoring feature may include any data associated with an application. For example, application scoring features may include any of the application attributes included in the application record 314 or any additional parameters related to the application, such as data indicating the popularity of an application (e.g., number of downloads) and the ratings (e.g., number of stars) associated with an application. A query scoring feature may include any data associated with the search query 102. For example, query scoring features may include, but are not limited to, a number of words in the search query 102, the popularity of the search query 102, and the expected frequency of the words in the search query 102. An application-query scoring feature may include any data which may be generated based on data associated with both the application and the search query 102 that resulted in identification of the application record 314 by the set generation module 404. For example, application-query scoring features may include, but are not limited to, parameters that indicate how well the terms of the search query 102 match the terms of the identified application record 314. The set processing module 406 may generate a result score for an application based on at least one of the application scoring features, the query scoring features, and the application-query scoring features.

The set processing module 406 may determine a result score based on one or more of the scoring features listed herein and/or additional scoring features not explicitly listed. In some examples, the set processing module 406 may include one or more machine learned models (e.g., a supervised learning model) configured to receive one or more scoring features. The one or more machine learned models may generate result scores based on at least one of the application scoring features, the query scoring features, and the application-query scoring features. For example, the set processing module 406 may pair the search query 102 with each application and calculate a vector of features for each (query, application) pair. The vector of features may include application scoring features, query scoring features, and application-query scoring features. The set processing module 406 may then input the vector of features into a machine-learned regression model to calculate a result score that may be used to rank the application in the search results 50 for the search query 102.

The results scores may be used in a variety of different ways. In some examples, the result scores may be used to rank the applications in a list of results that is presented on a user device 200. In these examples, a larger result score may indicate that the application is more relevant to a user than an application having a smaller result score. In examples where the search results 50 are displayed as a list on a user device 200, the applications associated with larger result scores may be listed nearer to the top of the results list (e.g., near to the top of the screen). In these examples, applications having lower result scores may be located farther down the list (e.g., off screen) and may be accessed by a user scrolling down the screen of the user device 200.

Referring back to FIG. 3A, a tagging module 316 can be configured to access an MDP data store 306, an application data store 304, and any other suitable devices in order to tag search results 50 such that they indicate a master application history 310. The tagging module 316 can receive the set of scored search results 50. Initially, the scored search results 50 are untagged search results 50 containing one or more untagged result objects 204. In some implementations, each untagged result object 204 corresponds to an application and contains data that the user device 200 renders. For example, an untagged result object 204 can contain the name of the application, an image associated with the application (e.g., an icon, a screenshot, and/or a video), a link to download the application, a description and rating of the application, a canonical application ID, and/or other information. The tagging module 316 may tag untagged result objects 204 included in the search results 50 based on the master device profile 302 associated with the user device 200 that sent the search query 102. The tagging module 316 tags untagged result objects 204 by configuring them to indicate the user's master application history 310. For example, when rendered by the user device 200, the displayed result objects 210 indicate the installation history of the application with respect to the collection of the user's user devices 200.

In some implementations, the tagging module 316 leverages canonical application IDs to determine whether to tag a result object. In particular, the tagging module 316, for each application listed in the search results 50, can obtain the canonical application ID of the application and compare the canonical application ID to a list of canonical application IDs indicated in the user's master device profile 302 (e.g., the lists of installed and uninstalled applications). If the tagging module 316 identifies matching canonical application IDs, the tagging module 316 tags the corresponding result object and indicates which user device's 200 are implicated by the master device profile 302. In other words, the tagging module 316 tags the result object to indicate which devices the corresponding application has been installed on or uninstalled from. In this way, the tagging module 316 generates tagged search results 212 that indicate to the user, regardless of the platforms on which the user devices 200 are configured to run, whether applications corresponding to the tagged search results 212 have been installed on or uninstalled from the user devices 200 associated with the user. The tagging module 316 (or a downstream component of the search engine 20) transmits the tagged search results 212 to the user device 200 that generated the search query 102.

Tags can be represented in any suitable manner. In some implementations, tags may be represented as a series of bits included in a tagged result object 206. In other implementations, tags may be represented by a number, symbol, character, image, or any other suitable identifier. Tags can be used to indicate installation status in a variety of different ways. For example, in some implementations tags can indicate the installation status of a particular application on a subset of a user's user devices 200. In other implementations, tags can indicate the installation status of a particular application on all of a user's user devices 200.

Figure 5A:
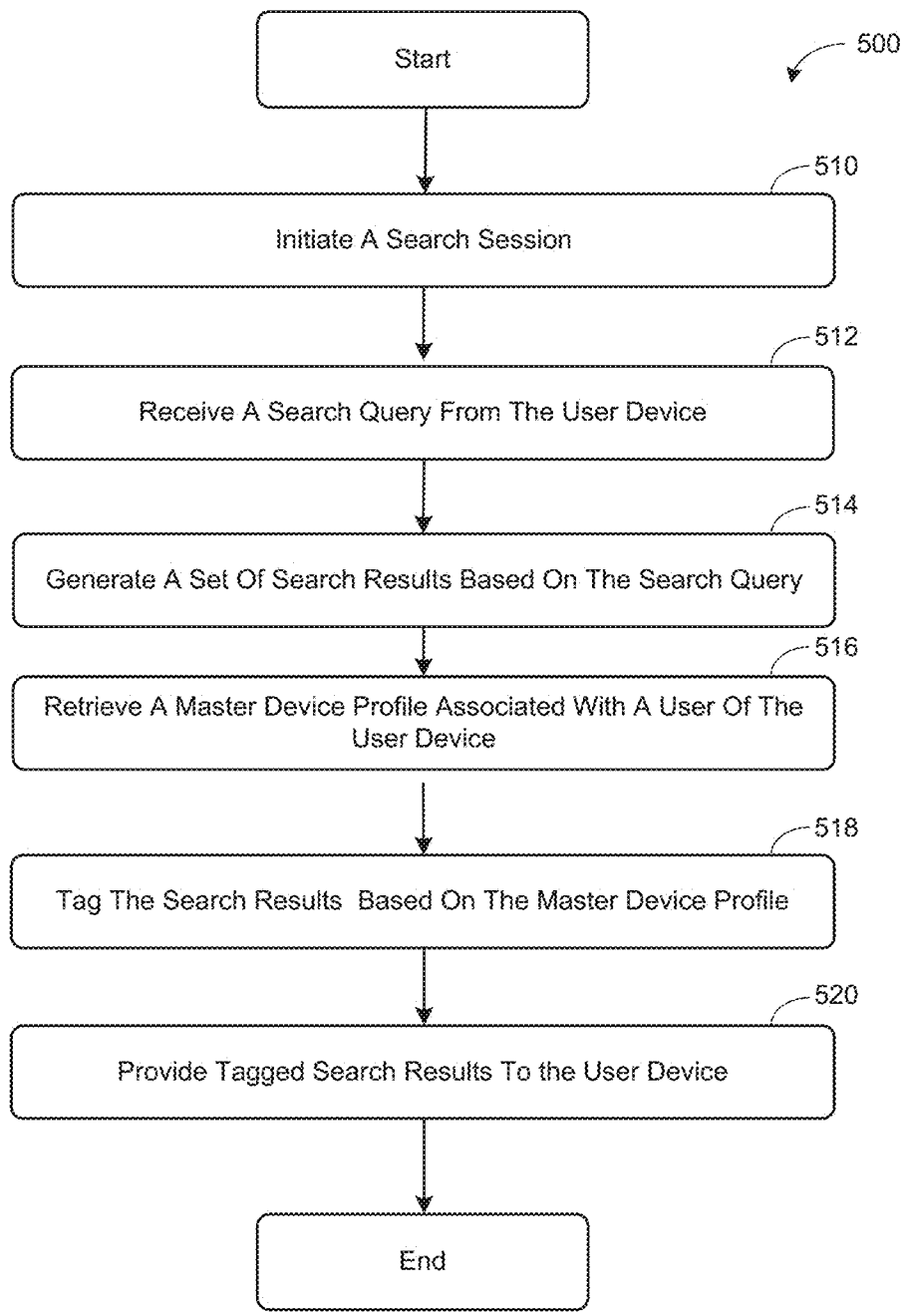
FIG. 5A is a flow chart illustrating an example set of operations of a method for providing tagged search results to a user device.

FIG. 5A shows an example set of operations of a method 500 for providing tagged search results 212 that indicate a master application history 310. The tagged search results 212 may be based on a received search query 102 and a master device profile 302. For purposes of explanation, the method 500 is explained with respect to the components of the search engine 20.

At operation 510, the search module 312 initiates a search session. The search module 312 may initiate the search session in response to a request for a search session from a user device 200. The search module 312 can open a new search session and assign a session ID to the new search session. The search module 312 can communicate the session ID to the user device 200, thereby confirming initiation of the search session.

At operation 512, the search engine 20 receives a search query 102 from the user device 200. The search query 102 may be received in a query wrapper 40. The user device 200 may include any other suitable information in the query wrapper 40. For example, the query wrapper 40 may contain query parameters 104 that indicate a user ID 308 corresponding to the user associated with the user device 200 and/or a platform of the user device 200.

At operation 514, the search module 312 identifies, or generates, a set of search results 50 based on the search query 102. The search module 312 utilizes the search query 102 to identify a set of search results 50 containing untagged result objects 204. Untagged result objects 204 correspond to applications that are relevant to the search query 102. In some implementations, the search module 312 identifies the relevant applications using the application records 314 in the application data store 304.

At operation 516, the search module 312 retrieves a master device profile 302 associated with the user of the user device 200 that initiated the search session. The search module 312 can access the MDP data store 306 to retrieve the appropriate master device profile 302. In some examples, there may not be a master device profile 302 in the MDP data store 306 associated with the user device 200. In these examples, the MDP generation module 300 can generate a master device profile 302 and store it in the MDP data store 306 for access by the search module 312.

At operation 518, the tagging module 316 receives the search results 50 containing the untagged result objects 204. The tagging module 316 tags the untagged result objects 204 based on the master application history 310, creating tagged search results 212. The tagged search results 212 may contain both tagged result objects 206 and untagged result objects 204.

At operation 520, the search engine 20 provides the tagged search results 212 to the requesting user device 200. The tagged search results 212 contain tagged result objects 206 and untagged result objects 204, both of which have been configured to be rendered as displayed result objects 210. Displayed result objects 210 may contain device indicators 238 if they were rendered from a tagged result object 206.

Figure 5B:
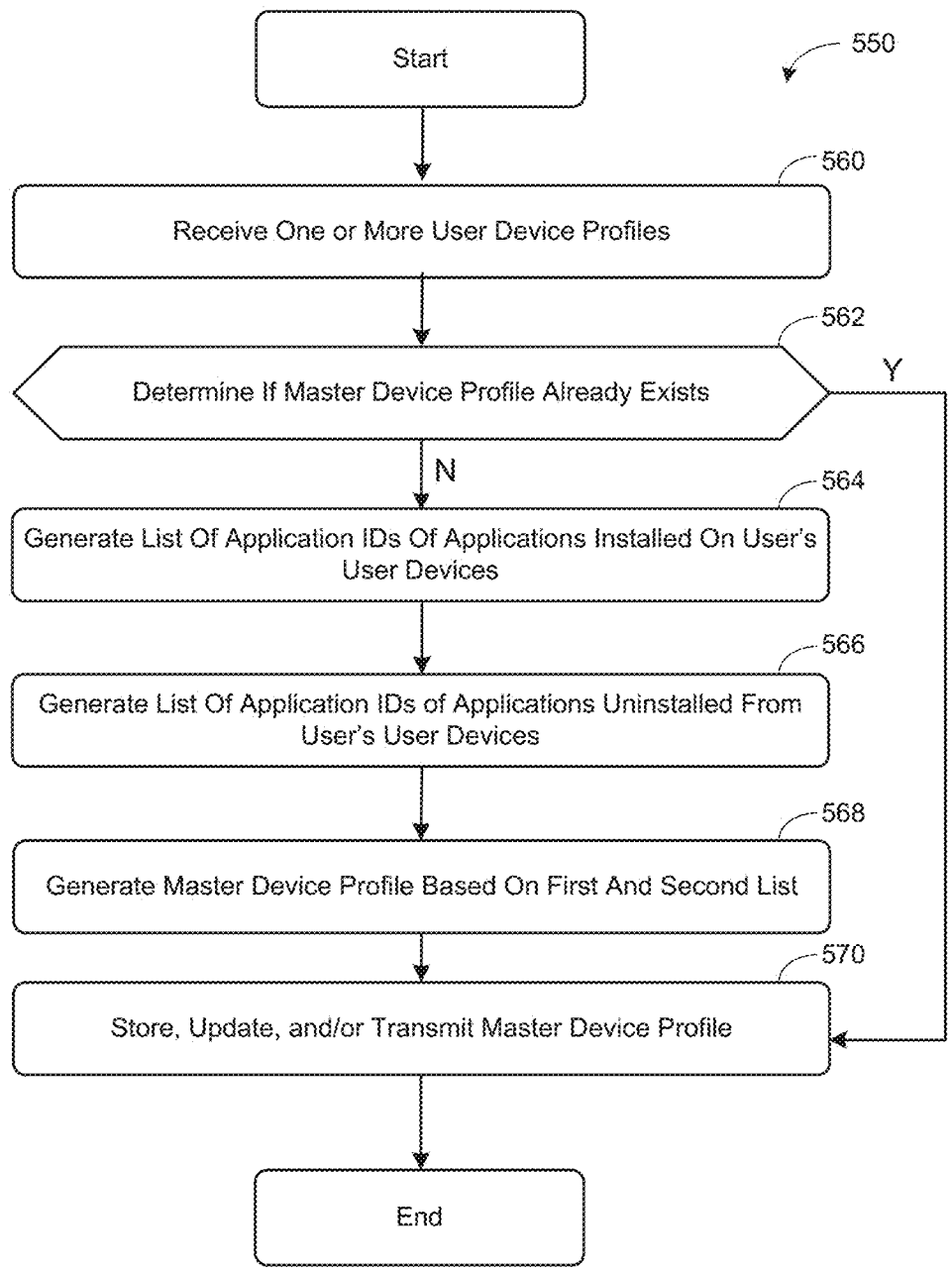
FIG. 5B is a flow chart illustrating an example set of operations of a method for generating a master device profile.

FIG. 5B shows an example set of operations of a method 550 for generating, obtaining, and/or updating a master device profile 302. The master device profile 302 may be based on one or more user device profiles 202. In some implementations, an MDP generation module 300 can execute the operations outlined by the method 550 to generate a master device profile 302.

At operation 560, the MDP generation module 300 obtains (e.g., retrieves or receives) one or more user device profiles 202. The one or more user devices profiles 202 may be received from one or more user devices 200 via a network and/or any other suitable medium. Additionally or alternatively, the one or more user device profiles 202 may be acquired from a storage device such as the MDP data store 306 or any other suitable data storage system.

At operation 562, the MDP generation module 300 determines whether or not there already exists a master device profile 302 associated with the received user device profiles 202. In some implementations, the MDP generation module 300 can access the MDP data store 306 to make this determination. If there already exists a master device profile 302 in the MDP data store 306 that references the received user device profiles 202, the MDP generation module 300 can skip to operation 570 where it can update the stored master device profile 302 based on the received user device profiles 202. If there does not exist a master device profile 302 based on the user device profiles 202, the MDP generation module 300 may proceed to operation 564 and generate a new master device profile 302.

At operation 564, the MDP generation module 300 generates a list of application IDs of applications installed on the user's user devices 200. The MDP generation module 300 accesses the individual user device profiles 202. For each user device profile 202, the MDP generation module 300 generates a list of applications installed on the user device 200 by extracting the installed application IDs 234 stored in the corresponding user device profile 202. The MDP generation module 300 combines the lists of installed application IDs 234 into a first list of application IDs.

At operation 566, the MDP generation module 300 generates a list of application IDs of applications uninstalled from the user's user devices 200. The MDP generation module 300 accesses the individual user device profiles 202. For each user device profile 202, the MDP generation module 300 generates a list of applications uninstalled from the user device 200 by extracting the uninstalled application IDs 232 stored in the corresponding user device profile 202. The MDP generation module 300 combines the lists of uninstalled application IDs 232 into a second list of application IDs.

At operation 568, the MDP generation module 300 generates a master device profile 302 based on the first and second lists of application IDs. The MDP generation module 300 creates a data structure that contains a user ID 308 and a master application history 310. The user ID 308 may be generated in any suitable manner as long as it allows for differentiation from other master device profiles 302. For example, the user ID 308 may be generated randomly or sequentially. The master application history 310 can be created by combining the first and second list of application IDs generated during operation 564 and 566. The first and second list of application IDs represent lists of applications that have been, respectively, installed on or uninstalled from the user's user devices 200. Additionally or alternatively, the MDP generation module 300 may store the individual user device profiles 202 within the master device profile 302.

At operation 570, the MDP generation module 300 either stores, updates, and/or transmits the master device profile 302. In the case where the master device profile 302 already exists per the determination at operation 562, the MDP generation module 300 can update the existing master device profile 302 using the received user device profiles 202. The update process works similarly to operations 564 and 566. Instead of generating a new master device profile 302 with the lists of application IDs from operations 564 and 566, the existing master device profile 302 is updated based on differences between the newly generated lists of application IDs and the IDs appearing in the existing master application history 310. In the case where the master device profile 302 has been newly generated, at operation 570 the MDP generation module 300 stores the newly generated master device profile 302 in the MDP data store 306. In some implementations, a user can decide to opt-out of providing user data to the search engine 20. In such a scenario, the MDP generation module 300 does not store the master device profile 302. Instead, the MDP generation module 300 transmits (but does not store) the newly created or updated master device profile 302. The MDP generation module 300 may transmit the master device profile 302 to any suitable device, such as to a downstream component of the search engine 20 or to a user device 200.

Figure 6:
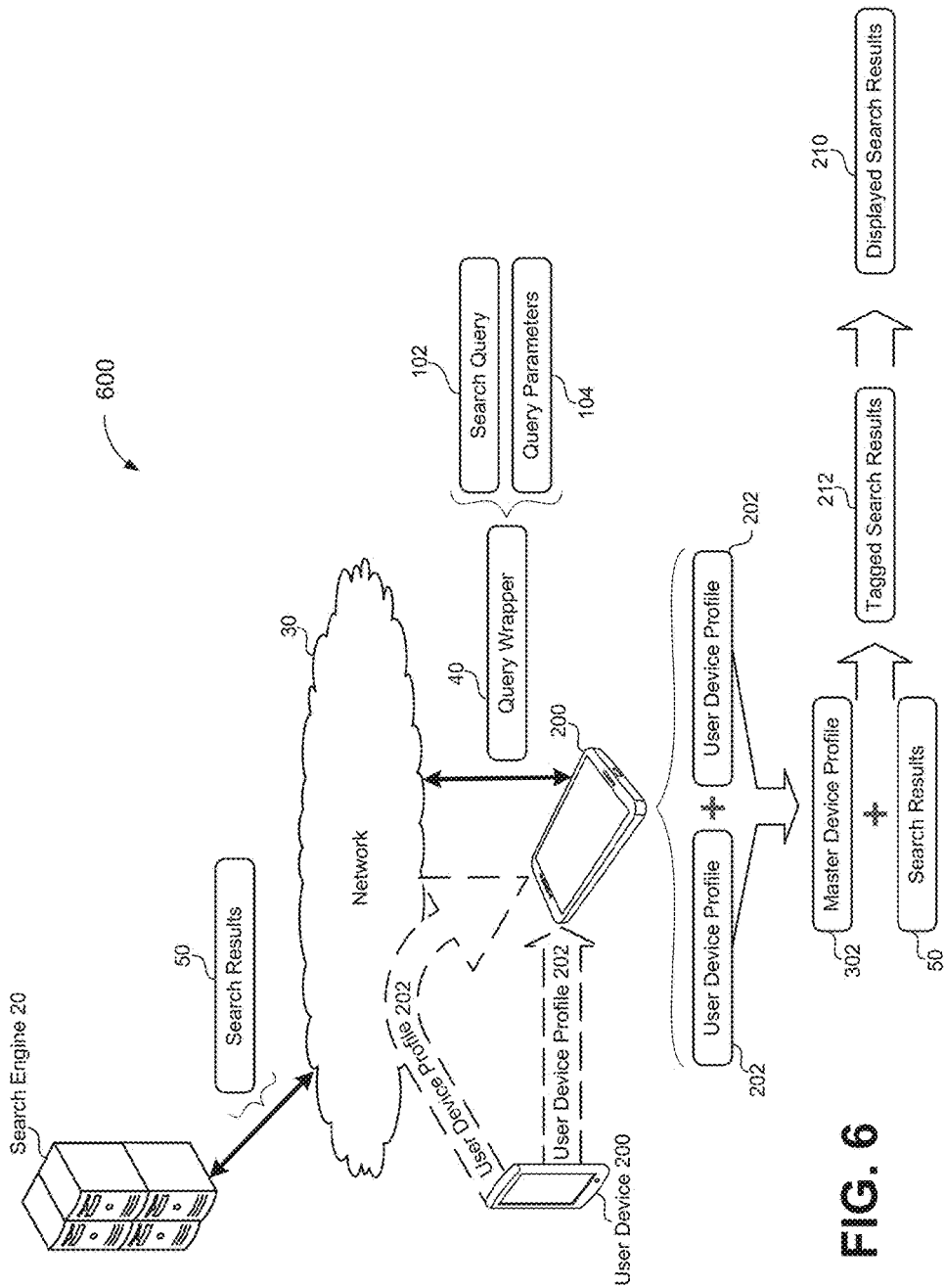
FIG. 6 is a schematic illustrating an example environment where a user device generates a master device profile for a set of user devices.

The search engine 20 is described herein as generating the master device profile 302 and tagging search results 50 for a user device 200 in response to a search query 102. FIG. 6 illustrates an alternative environment 600 of a search engine 20. In the illustrated example, the requesting user device 200 uses a search application 216 (e.g., FIG. 2A) to generate and store the master device profile 302. The search application 216 can receive untagged search results 50 from the search engine 20. In these implementations, the search application 216 may also tag the search results 50 generated by the search module 312. For example, the search application 216 can create the master device profile 302 based on its own user device profile 202 and one or more user device profiles 202 that it may receive from other user devices 200 of the user.

In these implementations, the search application 216 can be configured to perform the functions executed by the MDP generation module 300 and the tagging module 316. In some implementations, the search application 216 receives user device profiles 202 from one or more user devices 200 associated with a user. In some implementations, the other user devices 200 transmit their respective user device profiles 202 via a network 30 to the search engine 20. In other implementations, the other user devices 200 transmit their respective user device profiles 202 via a personal area network, such as a Bluetooth or near-field communication network. The search application 216 merges the device histories 230 from the user device profiles 202 to generate a master device profile 302 of the user's user devices 200 in the manner described above.

In these implementations, the search application 216 is further configured to perform the functions executed by the tagging module 316. In particular, the search application 216 tags the search results 50 based on the master device profile 302. The search application 216 receives untagged search results 50 and tags the untagged search results 50 in accordance with the master device profile 302. The search application 216 can tag the search results 50 in the manner described above. In these implementations, the search application 216 can display tagged search results 212 to the user without the user's master device profile 302 being stored by the search engine 20.

Figure 7:
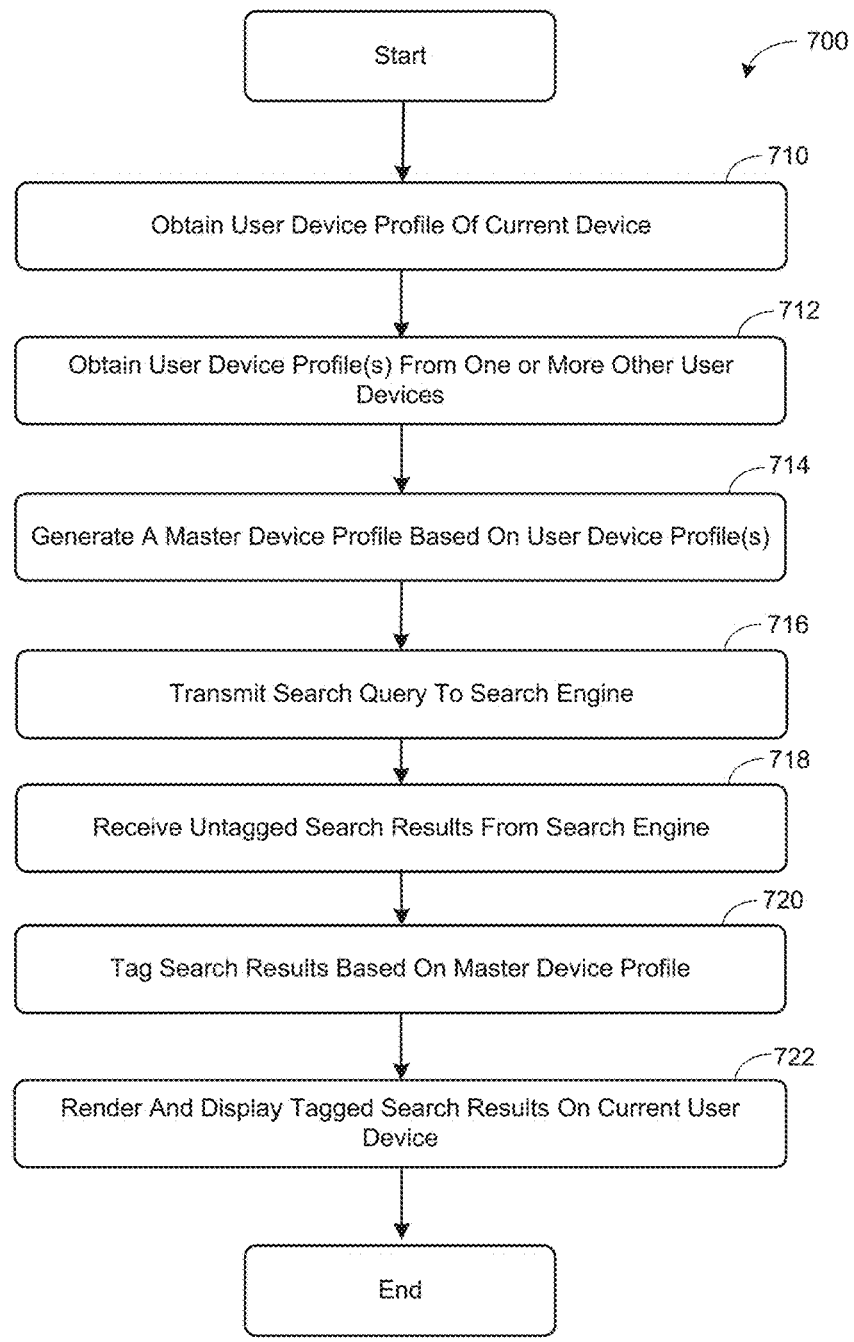
FIG. 7 is a schematic illustrating an example set of operations of a method for providing search results that indicate a user's application installation history using a device-generated master device profile.

FIG. 7 shows an example set of operations of a method 700 for receiving search results 50 and displaying them such that they indicate a master application history 310. For purposes of explanation, the method 700 is explained with respect to the components of the search engine 20 and the user device 200.

At operation 710, the search application 216 obtains the user device profile 202 of the user device 200 it is currently running on. The search application 216 may be configured to access the user device profile 202 from the user device's 200 storage device 226. Additionally or alternatively, the search application 216 may be configured to generate a user device profile 202 for the user device 200 based on the native applications 220 that are currently installed on the user device 200 and/or native applications 220 that have been uninstalled from the user device 200.

At operation 712, the search application 216 can obtain user device profiles 202 from one or more other user devices 200. The search application 216 can obtain the other user device profiles 202 in any suitable manner, including via the network 30 or directly from the other user devices 200 via short-range Bluetooth or Wi-Fi.

At operation 714, the search application 216 generates a master device profile 302 based on the obtained user device profiles 202. The search application 216 can be configured generate the master device profile 302 in the same manner as the MDP generation module 300 described in the previous embodiment.

At operation 716, the search application 216 can transmit a user-input search query 102 to the search engine 20. As previously discussed, the search application 216 receives a search query 102 via a user interface. The search application 216 can transmit the search query 102 in a query wrapper 40. The query wrapper 40 may contain any suitable information as described above.

At operation 718, the search application 216 can receive search results 50 containing untagged result objects 204 from the search engine 20. At operation 720, the search application 216 can tag the search results 50 based on the master device profile 302. The search application 216 tags result objects by configuring them to include device indicators 238 (see FIG. 1B) upon rendering and displaying.

At operation 722, the search application 216 outputs the tagged search results 212 to the user interface 224. The current user device 200 can render the tagged result objects 206 and the untagged result objects 204 into displayed result objects 210. The displayed result objects 210 may contain device indicators 238 if their corresponding application has been installed on and/or uninstalled from one or more of the user's devices 200. The displayed result objects 210 may also include a user selectable link 240 that navigates the user device 200 to the digital distribution platform where the user device 200 can download the corresponding application.

The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the memory components and the I/O components. For example, the one or more processing units may be configured to communicate with the memory components and the I/O components via the interconnect components.

A memory component, or memory, may include any volatile or non-volatile media. For example, a memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology (e.g., compact disc, digital versatile disc, and/or Blu-ray Disc), or any other memory components.

The memory components may include (e.g., store) data described herein. For example, the memory components may include the application data (e.g., application records) included in the application data store 304 and user data (e.g., master device profiles) included in the MDP data store 306. The memory components may also include instructions that may be executed by one or more processing units. For example, a memory may include computer-readable instructions that, when executed by one or more processing units, cause the one or more processing units to perform the various functions attributed to the modules and data stores described herein.

The I/O components may refer to electronic hardware and software that provides communication with a variety of different devices. For example, the I/O components may provide communication between other devices and the one or more processing units and memory components. In some examples, the I/O components may be configured to communicate with a computer network. For example, the I/O components may be configured to exchange data over a computer network using a variety of different physical connections, wireless connections, and protocols. The I/O components may include, but are not limited to, network interface components (e.g., a network interface controller), repeaters, network bridges, network switches, routers, and firewalls. In some examples, the I/O components may include hardware and software that is configured to communicate with various human interface devices, including, but not limited to, display screens, keyboards, pointing devices (e.g., a mouse), touchscreens, speakers, and microphones. In some examples, the I/O components may include hardware and software that is configured to communicate with additional devices, such as external memory (e.g., external HDDs).

In some implementations, the search engine 20 may be a system of one or more computing devices (e.g., a computer search system and a master device profile maintenance system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the search engine 20 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs). The one or more computing devices of the search engine 20 can be configured to communicate with the network 30. The one or more computing devices of the search engine 20 may also be configured to communicate with one another via a computer network. In some examples, the one or more computing devices of the search engine 20 may include one or more server computing devices configured to communicate with user devices 200 (e.g., receive query wrappers 40 and transmit search results 50). The one or more computing devices may reside within a single machine at a single geographic location in some examples. In other examples, the one or more computing devices may reside within multiple machines at a single geographic location. In still other examples, the one or more computing devices of the search engine 20 may be distributed across a number of geographic locations.

What is claimed is:

1. A method comprising:
    obtaining, by a processing device of an application search engine, a first user device profile indicating a first set of applications installed on a first user device associated with a user;
    obtaining, by the processing device, a second user device profile indicating a second set of applications installed on a second user device associated with the user;
    generating, by the processing device, a master device profile based on the first user device profile and the second user device profile, the master device profile including a master application installation history that indicates applications installed on the first user device and applications installed on the second user device;
    receiving, by the processing device, a search query from the first user device;
    identifying, by the processing device, search results based on the search query, wherein the search results include a plurality of result objects and wherein each result object respectively indicates an application relevant to the search query and includes data an instructions that are used by the first user device to display a link to download a native application edition of the application from a digital distribution platform;
    for each result object in the plurality of result objects:
        determining, by the processing device, whether the application indicated by the result object appears in the master application installation history; and
        in response to the application indicated by the result object appearing in the master application installation history and the master application installation history indicates that the application is installed on the second user device, tagging the result object of the application with a tag to indicate that the application is installed on the second user device, wherein the tag causes the first user device to display an indication that the application is installed on the second user device;
    generating, by the processing device, tagged search results based on the search results and any tags applied to any of the result objects of the search results; and
    providing, by the processing device, the tagged search results to the first user device.

2. The method of claim 1, wherein the tagged search results are configured to, when rendered by the first user device into displayed result objects, visually indicate which applications indicated by the result objects of the search results have been installed on at least one of the first user device and the second user device.

3. The method of claim 1, wherein:
    the first user device profile includes a first list of application identifiers, each application identifier in the first list indicating one of the applications installed on the first user device;
    the second user device profile includes a second list of application identifiers, each application identifier in the second list indicating one of the applications installed on the second user device; and
    the master device profile includes a master list of application identifiers, each application identifier in the master list indicating one of the applications installed on at least one of the first user device and the second user device.

4. The method of claim 3, wherein generating the master device profile includes:
adding the first list of application identifiers to the master list of application identifiers; and
adding the second list of application identifiers to the master list of application identifiers.

5. The method of claim 3, wherein the application identifiers in the first, second, and master lists of application identifiers are canonical application identifiers.

6. The method of claim 1, wherein:
the first user device profile is further indicative of a first set of deleted applications that have been uninstalled from the first user device;
the second user device profile is further indicative of a second set of deleted applications that have been uninstalled from the second user device; and
the master device profile is further indicative of a master set of deleted applications that have been uninstalled from at least one of the first user device and the second user device.

7. The method of claim 6, further comprising:
determining, by the processing device, whether any of the applications indicated by the result objects of the search results appear in the master set of deleted applications; and
for each application indicated by the result objects and indicated in the master set of deleted applications, tagging the result object of the application to indicate that the application has been uninstalled from at least one of the first user device and the second user device.

8. The method of claim 1, wherein the tagged search results further indicate on which user device each respective application is installed.

9. The method of claim 1, wherein the tagged search results further indicate from which user device each respective application has been uninstalled.

10. A search engine comprising:
a storage device that stores:
an application data store that stores a plurality of application records, each application record including an application record identifier; and
a master device profile data store that stores a plurality of master device profiles, each master device profile corresponding to a different user and indicating a master application installation history of one or more user devices of the different user; and
a processing device that executes instructions from a computer-readable medium, wherein the instructions, when executed by the processing device, cause the processing device to:
obtain a first device profile indicating a first set of applications installed on a first user device associated with a user;
obtain a second device profile indicating a second set of applications installed on a second user device associated with the user;
generate a new master device profile based on the first device provide and the second device profile, the new master device profile including a master application installation history that indicates applications installed on the first user device and applications installed on the second user device;
receive a search query from the first user device;
identify a consideration set of application records from the application data store based on the search query,
each application record of the consideration set being indicative of an application relevant to the search query;
generate search results based on the identified application records, wherein the search results include a plurality of result objects and wherein each result object respectively indicates an application relevant to the search query and includes data and instructions that are used by the first user device to display a link to download a native application edition of the application from a digital distribution platform;
for each result object in the plurality of result objects:
determine whether the application indicated by the result object appears in the master application installation history; and
in response to the application indicated by the result object appearing in the master application installation history and the master application installation history indicates that the application is installed on the second user device, tag the result object of the application with a tag to indicate that the application is installed on the second user device, wherein the tag causes the first user device to display an indication that the application is installed on the second user device;
generate tagged search results based on the search results and any tags applied to any of the result objects of the search results; and
provide the tagged search results to the first user device.

11. The search engine of claim 10, wherein the tagged search results are configured to, when rendered by the first user device into displayable search results, visually indicate which applications indicated by the application records of the consideration set have been installed on at least one of the first user device and second user device.

12. The search engine of claim 10, wherein:
the first device profile includes a first list of application identifiers, each application identifier in the first list indicating one of the applications installed on the first user device;
the second device profile includes a second list of application identifiers, each application identifier in the second list indicating one of the applications installed on the second user device; and
the new master device profile includes a master list of application identifiers, each application identifier in the master list indicating one of the applications installed on at least one of the first user device and the second user device.

13. The search engine of claim 12, wherein the instructions that cause the processing device to generate the new master device profile include instructions that cause the processing device to:
add the first list of application identifiers to the master list of application identifiers; and
add the second list of application identifiers to the master list of application identifiers.

14. The search engine of claim 12, wherein the application identifiers in the first, second, and master lists of application identifiers are canonical application identifiers.

15. The search engine of claim 10, wherein:
the first device profile is further indicative of a first set of deleted applications that have been uninstalled from the first user device;
the second device profile is further indicative of a second set of deleted applications that have been uninstalled from the second user device; and the new master device profile is further indicative of a master set of deleted applications that have been uninstalled from at least one of the first user device and the second user device.

16. The search engine of claim 10, further comprising instructions that cause the processing device to:
determine whether any of the applications indicated by the application records of the consideration set appear in the master set of deleted applications; and
for each application indicated by the application records and indicated in the master set of deleted applications, tag the application record of the application to indicate that the application has been uninstalled from at least one of the first user device and second user device.

17. The search engine of claim 10, wherein the tagged search results further indicate on which user device each respective application is installed.

18. The search engine of claim 10, wherein the tagged search results further indicate from which user device each respective application has been uninstalled.

19. A method comprising:
generating, by a processing device of a user device associated with a user, a local user device profile based on applications that have been installed on the user device;
obtaining, by the processing device, a remote user device profile based on applications that have been installed on a remote user device associated with the user;
generating, by the processing device, a master device profile based on the local user device profile and the remote user device profile, the master device profile including a master application installation history indicative of applications installed on the user device and installed on the remote user device;
transmitting, by the processing device, a search query to a server;
receiving, by the processing device, a set of search results based on the search query, wherein the search results include a plurality of result objects and wherein each result object is indicative of an application relevant to the search query and includes data and instructions that are used by the user device to display a link to download a native application edition of the application from a digital distribution platform;
for each result object in the plurality of result objects:
determine whether the application indicated by the result object appears in the master application installation history; and
in response to the application indicated by the result object appearing in the master application installation history and the master application installation history indicates that the application is installed on the remote user device, tag the result object of the application with a tag to indicate that the application is installed on the remote user device, wherein the tag causes the user device to display an indication that the application is installed on the remote user device; and
rendering, by the processing device, displayed search results based on the result objects and any tags applied to the result objects.

20. The method of claim 19, wherein:
generating the local user device profile includes identifying a list of applications installed on the user device; and
associating applications in the list with corresponding application identifiers.

21. The method of claim 19, wherein displayed result objects visually indicate which applications indicated by the result objects of the search results have been installed on at least one of the user device and the remote user device.

22. The method of claim 19, wherein:
the local user device profile includes a first list of application identifiers, each application identifier in the first list indicating one of the applications installed on the user device;
the remote user device profile includes a second list of application identifiers, each application identifier in the second list indicating one of the applications installed on the remote user device; and
the master device profile includes a master list of application identifiers, each application identifier in the master list indicating one of the applications installed on at least one of the user device and the remote user device.

23. The method of claim 22, wherein generating the master device profile includes:
adding the first list of application identifiers to the master list of application identifiers; and
adding the second list of application identifiers to the master list of application identifiers.

24. The method of claim 22, wherein the application identifiers in the first, second, and master lists of application identifiers are canonical application identifiers.

25. The method of claim 19, wherein:
the local user device profile is further indicative of a first set of deleted applications that have been uninstalled from the user device;
the remote user device profile is further indicative of a second set of deleted applications that have been uninstalled from the remote user device; and
the master device profile is further indicative of a master set of deleted applications that have been uninstalled from at least one of the user device and the remote user device.

26. The method of claim 25, further comprising:
determining, by the processing device, whether any of the applications indicated by the result objects of the search results appear in the master set of deleted applications; and
for each application indicated by the result objects and indicated in the master set of deleted applications, tagging the result object of the application to indicate that the application has been uninstalled from at least one of the user device and remote user device.

27. The method of claim 19, wherein the displayed search results further indicate on which user device each respective application is installed.

28. The method of claim 19, wherein the displayed search results further indicate from which user device each respective application has been uninstalled.

29. The method of claim 19, wherein the user device receives the remote user device profile directly from the remote user device via a personal area network.

30. The method of claim 19, wherein the user device receives the remote user device profile from the remote user device via a third party computing device.

* * * * *